United States Patent [19]

Lok et al.

[11] 4,297,335

[45] Oct. 27, 1981

[54] ALUMINUM DEFICIENT ZEOLITE COMPOSITIONS AND PROCESS FOR PREPARING SAME

[75] Inventors: Brent M. T. Lok, New City, N.Y.; Thomas J. P. Izod, Holliston, Mass.

[73] Assignee: Union Carbide Corporation, New York, N.Y.

[21] Appl. No.: 133,848

[22] Filed: Mar. 25, 1980

[51] Int. Cl.³ ............................................. C01B 33/28
[52] U.S. Cl. .................................... 423/328; 252/442; 252/455 Z
[58] Field of Search ..................... 423/328; 252/455 Z

[56] References Cited

U.S. PATENT DOCUMENTS

| | | | |
|---|---|---|---|
| 3,477,965 | 11/1969 | Fishel | 252/455 Z |
| 3,594,331 | 7/1971 | Elliott | 252/455 Z |
| 3,630,965 | 12/1971 | Voorhies et al. | 252/442 |
| 3,699,056 | 10/1972 | Takase et al. | 252/442 |
| 3,702,312 | 11/1972 | Wilson | 252/442 |
| 3,839,539 | 10/1974 | Elliott | 423/329 |
| 3,933,983 | 1/1976 | Elliott | 423/328 |

*Primary Examiner*—Edward J. Meros
*Attorney, Agent, or Firm*—Richard G. Miller

[57] ABSTRACT

The hydrophobicity of crystalline zeolites is enhanced and their catalytic activity altered by treatment with fluorine under controlled conditions which result in dealumination and structural stabilization as evidenced by changes observed in their infrared framework spectra.

10 Claims, No Drawings

ALUMINUM DEFICIENT ZEOLITE COMPOSITIONS AND PROCESS FOR PREPARING SAME

The present invention relates in general to crystalline zeolite compositions which have enhanced hydrophobic character and modified catalytic properties. More particularly it relates to crystalline zeolites which have been treated with fluorine to alter the framework aluminum content and the acidic sites thereof with resultant modification of both the adsorptive and catalytic properties.

Although there are a few notable exceptions, the vast majority of naturally-occurring and synthetic crystalline zeolites contain a substantial proportion of $AlO_4$—tetrahedra, i.e. frameworks aluminum atoms, which together with the $SiO_4$ tetrahedra comprise the zeolite crystal framework. It is generally accepted that these aluminum-containing structural units provide the so-called "acid sies" which account for the catalytic activity of zeolites in such hydrocarbon conversion reactions as catalytic cracking. These same acid sites are also responsible in one or more ways for the adsorptive preference of most zeolites for strongly polar molecules such as water, i.e., their hydrophilic character.

A number of different techniques have heretofore been proposed to remove framework aluminum atoms from zeolites to create aluminum-deficient lattice structues having fewer acid sites, and consequently less hydrophilicity, and an altered catalytic activity. In some instances the techniques employed are too rigorous to permit sufficient dealumination to significantly alter either the hydrophilicity or the catalytic activity before causing the collapse of the entire crystal lattice. In other cases the lattice structure of the starting zeolite has sufficient integrity so that the dealumination is permitted to proceed to a degree which engenders a remarkable degree of hydrophobicity in the product zeolite and further enhances its thermal and/or hydrothermal stability.

One of the more common early techniques for dealuminizing zeolites involves contacting either the hydrogen or decationized form of a zeolite with a known chelating agent for aluminum such as ethylene diaminetetraacetic acid (EDTA) or acetylacetone and removing aluminum as an organometallic complex. A more recent and more widely used procedure involves prolonged contact of non-metallic cation forms of zeolites with steam at elevated temperatures which can exceed 800° C. Although quite effective for their intended purpose, these steaming procedures are very costly and highly energy-consuming.

It is therefore the general object of the present invention to provide an alternate process for enhancing the hydrophobic character and stability of zeolites by decreasing the number of acid sites in the framework structure. This object, and others which will be apparent from the present specification is accomplished by the process which comprises;

(a) providing an activated crystalline zeolitic aluminosilicate having a $SiO_2/Al_2O_3$ molar ratio of at least 2, preferably in the range of 4 to 190, and having at least 50 percent, preferably at least 90 percent, of the framework aluminum atoms not associated with metal cations, (b) contacting said activated aluminosilicate with a gas mixture comprising (i) from 0.1 to 20 volume percent fluorine
(ii) from zero to 21 volume percent oxygen
(iii) and as the remainder, one or a mixture of two or more inert gases. preferably nitrogen, said contact being at a temperature of from about 50° to 400° F. for a period of at least 1 minute preferably from about 5 to 60 minutes. Optionally the resulting fluorinated zeolite can be further treated by calcination at temperatures above 500° C. and up to the crystal destruction temperature of the zeolite, or by rehydrating same, or a combination of the two treatments in either order.

Crystalline zeolites suitably treated in accordance with the present invention include erionite, mordenite, zeolite Y, zeolite omega, zeolite beta, zeolite ZSM-5, zeolite ZSM-11, zeolite L, zeolite ZSM-12 and zeolite ZSM-35. Both naturally occurring and synthetically prepared zeolites can be used. Zeolite Y is disclosed in U.S. Pat. No. 3,130,007; zeolite omega in U.S. Pat. No. 4,241,036; zeolite beta in U.S. Pat. No. 3,308,069, zeolite ZSM-5, in U.S. Pat. No. 3,702,886; zeolite ZSM-11 in U.S. Pat. No. 3,709,979; zeolite L in U.S. Pat. No. 3,216,789; zeolite ZSM-12 in U.S. Pat. No. 3,832,449; and zeolite ZSM-35 in U.S. Pat. No. 3,992,466. Those zeolite species which in their as-synthesized form contain the requisite proportion of non-metallic cations can be utilized without modification of their cation population. In those cases in which the zeolite contains too large a poroportion of metal cations associated with the $AlO_4$—tetrahedra, conventional ion-exchange techniques can be resorted to in order to replace a sufficient proportion of metal cation with non-metallic cations such as hydrogen, ammonium or quaternary ammonium species. The zeolites can, if desired, be calcined to thermally remove some or all of the non-metallic cations to produce the corresponding decationized form. Calcination at a temperature of about 400° C. for 2 hours is usually sufficient to activate hydrated zeolites by the evolution of their water of hydration.

In contacting the zeolite starting materials with fluorine it is advantageous to utilize a reactor having means for evacuating the gases therefrom as well as means for regulating the temperature. A suitable procedure is to introduce the zeolite starting material into the reactor, adjust the temperature to the range of ambient to 60° C., remove the bulk of the air over the zeolite by means of a vacuum pump (a pressure of about $10^{-3}$ torr is adequate), introduce the fluorine-oxygen-inert gas mixture into the reactor using fluorine to zeolite proportions of from about $7 \times 10^{-3}$ to 1.4 grams fluorine per gram of zeolite for a period of about 1 to 60 minutes, and then evacuate the reactor to remove the residual fluorine. Thereafter the fluorine treated zeolite is heated to a temperature of about ambient to 150° C. under vacuum to remove adsorbed fluorine.

Although it has heretofore been proposed to treat silica gel with fluorine or hydrogen fluoride to increase its hydrophobicity, such procedure modifies the surface only. The hydrophobicity is created by the conversion of $\equiv Si-OH$ groups to $\equiv Si-F$ groups. Prolonged contact of the fluorinated product in contact with atmospheric water vapor results in the reconversion of the $\equiv Si-F$ groups to $\equiv Si-OH$ groups with the consequent loss of hydrophobicity. In marked contrast, the direct fluorination of zeolites in accordance with the present process not only modifies the zeolite surface, but also removes framework aluminum atoms and tends to stablize the structure. Post-fluorination calcination at temperatures in the range of about 500° C. to 700° C. creates a permanently hydrophobic zeolite product.

The following examples illustrate the present process. In evaluating the hydrophobic character of the fluorinated zeolite products, one test procedure employed was a "shake-test" in which one gram of the activated zeolite sample was introduced into 10 ml. of a solution of 1.0 vol.-% n-butanol in water. The slurry of zeolite and solution was shaken for 90 minutes at ambient room temperature, and then the liquid phase was analyzed for residual n-butanol content. By difference the percent n-butaol adsorbed by the zeolite sample was determined, thereby providing a measure of the relative preference of the zeolite for the less polar adsorbate, i.e., its hydrophobicity. Another test procedure as a n-hexane delta loading test wherein a test sample of the zeolite was placed in a McBain-Bakr balance, activated at 350° C. for 16 hours under vacuum ($10^{-5}$ torr), and then exposed to about 20 torr of water vapor at ambient room temperature. After the adsorbed water loading on the zeolite reached a steady state under these conditions, n-hexane at a partial pressure of 40–50 torr was introduced into the water-containing atmosphere over the zeolite. The weight gain of the zeolite mass due to adsorption of n-hexane under these conditions (the delta n-hexane loading) was used as an indication of the degree of hydrophobicity of the sample. The greater the weight gain due to n-hexane adsorption the greater the degree of hydrophobicity.

EXAMPLE 1

(a) A series of seven 10 gram samples of synthetic large-port hydrogen mordenite having a $SiO_2/Al_2O_3$ molar ratio of 15.3 and having a $Na_2O/Al_2O_3$ molar ratio of 0.06 were calcined at 600° C. for about 120 minutes, cooled to 60° C., and contacted with fluorine-oxygen-nitrogen mixtures of various proportions for various time periods. The treated samples were then calcined in air at 600° C. for 120 minutes and thereafter tests for hydrophobicity using the aqueous n-butanol solution shake test. The pertinent data are set forth below in Table I.

TABLE I

| | Treatment Conditions | | | SHAKE TEST % n-butanol remaining in test sol | |
|---|---|---|---|---|---|
| Sample | % F$_2$ | % O$_2$ | Contact Time, min. | Trial #1 | Trial #2 |
| A | 5 | 2 | 10 | 0.605 | 0.605 |
| B | 10 | 2 | 10 | 0.747 | 0.738 |
| C | 10 | 2 | 5 | 0.747 | 0.738 |
| D | 10 | 2 | 10 | 0.747 | 0.746 |
| E | 10 | 0 | 10 | 0.813 | 0.795 |
| F | 10 | 2 | 10 | 0.747 | 0.738 |
| G | 10 | 10 | 10 | 0.781 | 0.769 |
| Blank | 0 | 0 | 0 | 0.989 | 0.996 |

EXAMPLE 2

(a) A series of tem samples of various synthetic zeolies were contacted with fluorine-oxygen-nitrogen mixtures in various proportions at either ambient room temperature (~23° C.) or 60° C. for various time periods. The treated samples were then calcined in air at 600° C. for 2 hours and thereafter the infrared spectra were run for band positions using a Fourier transform I.R. spectrometer. The pertinent data are set forth in Table II below: In reporting the fluorine-containing gas mixture, only the volume-% of fluorine and oxygen are specified. In each case the remaining portion of the gas mixture is nitrogen. Three prominent I.R. bands are also reported. Shifts in these bands to higher wave numbers in the fluorine-treated samples compared with the untreated starting zeolites, coupled with a degree of band sharpening are strong evidence of structural dealumination and stabilization.

TABLE II

| Sample | Zeolite | % F$_2$ | % O$_2$ | Contact Time, Min. | Temp., °C. | I.R. Band Positions, (cm$^{-1}$) | | |
|---|---|---|---|---|---|---|---|---|
| A | Type-Y[1] | 0 | 0 | 0 | — | 1065 | 819 | 595 |
| B | " | 2 | 5 | 5 | 60 | 1078 | 834 | 610 |
| C | " | 5 | 5 | 5 | 60 | 1083 | 835 | 614 |
| D | " | 5 | 5 | 10 | Ambient | 1078 | 833 | 611 |
| E | " | 2 | 0 | 5 | 60 | 1077 | 829 | 606 |
| F | " | 2 | 5 | 5 | 60 | 1078 | 834 | 611 |
| G | H$^+$-Mordenite[2] | 0 | 0 | 0 | — | 1078 | 799 | 578 |
| H | " | 10 | 2 | 10 | 60 | 1094 | 821 | 594,572 |
| I | " | 5 | 2 | 10 | 60 | 1097 | 824 | 594,571 |
| J | " | 5 | 5 | 10 | Ambient | 1092 | 822 | 594,571 |
| K | Type ZSM-5[3] | 0 | 0 | 0 | — | 1096 | 796 | 560 |
| L | " | 10 | 2 | 10 | 60 | 1099 | 799 | 558 |
| M | H$^+$-Erionite[4] | 0 | 0 | 0 | — | 1082 | 792 | 642 |
| N | " | 5 | 5 | 5 | 60 | 1098,1085 | 814 | 665 |

[1]Prepared by steaming at 600° C. an 85% NH$_4$$^+$-exchanged zeolite Y having a Si/Al ratio of 6.0. The product after an additional NH$_4$$^+$ exchange had a Na$_2$O/Al$_2$O$_3$ ratio was 0.01.
[2]Obtained from Norton Company: Si/Al = 7.5; Na$_2$O/Al$_2$O$_3$ = 0.06
[3]Prepared by acid washing a ZSM-5 type zeolite having a Si/Al ratio of 19; Na$_2$O/Al$_2$O$_3$ = 0.01
[4]Prepared by steaming at 600° C. an acid washed and NH$_4$$^+$-exchanged erionite mineral. The product has a Si/Al$_2$ ratio of 7 and a (K$_2$O + Na$_2$O/Al$_2$O$_3$ ratio of 0.11.

(b) For purposes of comparison with the samples of part (a) of this Example, samples of sodium zeolite Omega, potassium zeolite L, sodium zeolite Y and sodium mordenite were each contacted at 60° C. for 5 minutes with a mixture of 2% fluorine, 5% oxygen and 93% nitrogen at 60° C. The respective starting zeolites are characterized as follows:

1. Sodium zeolite Omega: Prepared by calcining an as-synthesized zeolite Omega sample having a SiO$_2$/Al$_2$O$_3$ molar ratio of 7.5 at 525° C. for about 40 minutes. The product has a Na$_2$O/Al$_2$O$_3$ molar ratio of 0.77

2. Potassium zeolite L: SiO$_2$/Al$_2$O$_3$ molar ratio=6.1 and the K$_2$O/Al$_2$O$_3$ molar ratio was 0.92
3. Sodium zeolite Y: SiO$_2$/Al$_2$O$_3$ molar ratio=4.7 and the Na$_2$O/Al$_2$O$_3$ molar ratio was 0.93
4. Sodium mordenite: A commercially available material obtained from Norton Company SiO$_2$/Al$_2$O$_3$=10.9; Na$_2$O/Al$_2$O$_3$=0.99

In each case the same characteristics I.R. bands as reported in part (a) were found to shift to higher wave numbers (indicating dealumination) but broadening of the bands rather than sharpening thereof occurred. This indiates stabilization had not occurred.

EXAMPLE 3

A decationized zeolite Y composition was prepared by steaming an ammonium-exchanged form having the composition (anhydrous)

0.9 N$_2$O:0.8 (NH$_4$$^+$)$_2$O;Al$_2$O$_3$:5.7 SiO$_2$ at a temperature of 600° C. for 0.67 hours with 1 atmosphere steam, cooling the steamed product, reducing the residual sodium level to 0.07 weight-% (anhydrous) by a second NH$_4$$^+$-exchange. The product had the composition (anhydrous).

0.01 Na$_2$O:0.9 (NH$_4$)$_2$O:Al$_2$O$_3$:5.9 SiO$_2$

Two samples of the product, each weighing 10 grams were contacted with a fluorine-oxygen-nitrogen mixture at 60° C. for 5 minutes and then calcined at 600° C. in air for 2 hours. Thereafter tests for hydrophobicity using the n-Butanol Shake Test were carried out on the non-fluorinated and the fluorinated samples. The results were as follows:

TABLE III

| | Treatment Conditions | | | SHAKE TEST % n-butanol remaining in test sol | |
|---|---|---|---|---|---|
| Sample | % F$_2$ | % O$_2$ | Contact Time, min. | Trial #1 | Trial #2 |
| A | 0 | 0 | — | 0.93 | 0.92 |
| B | 2 | 5 | 5 | 0.63 | 0.62 |
| C | 2 | 5 | 5 | 0.60 | 0.58 |

EXAMPLE 4

Samples of the same steamed zeolite Y, H$^+$-mordenite and H$^+$-ZSM-5 type zeolite starting materials as utilized in Example 2, supra, were treated with various fluorine-oxygen-nitrogen mixtures for various time periods and at various temperatures. The samples were then calcined at 600° C. in air for two hours and thereafter tested for hydrophobicity using the n-hexane delta loading test as hereinbefore described. The pertinent data are set forth in Table IV below.

TABLE IV

| | | Treatment Conditions | | | | η-Hexane Δ |
|---|---|---|---|---|---|---|
| Sample | Zeolite | % F$_2$ | % O$_2$ | Contact Time, Min. | Temp., °C. | Loading, wt.-% |
| A | Type -Y | 0 | 0 | 0 | — | 0.2 |
| B | " | 5 | 5 | 5 | 60 | 2.0 |
| C | " | 2 | 5 | 5 | 60 | 1.2 |
| D | " | 5 | 5 | 10 | Ambient | 2.0 |
| E | " | 2 | 0 | 5 | 60 | 1.6 |
| F | " | 2 | 5 | 5 | 52 | 3.5 |
| G | H$^+$-Mordenite | 0 | 0 | — | — | nil |
| H | " | 10 | 2 | 10 | 60 | 1.1 |
| I | " | 5 | 2 | 10 | 52 | 1.0 |
| J | " | 5 | 2 | 10 | 52 | 1.3 |
| K | H$^+$-ZSM-5 Type | 0 | 0 | 0 | — | 2.0 |
| L | " | 10 | 2 | 10 | 60 | 6.0 |

EXAMPLE 5

Samples of the same erionite mineral, steamed zeolite Y, H$^+$-mordenite and ZSM-5 type zeolite starting materials as utilized in Example 2, supra, were treated with various fluorine-oxygen-nitrogen mixtures at various temperatures for various periods of time. The samples were then calcined at 600° C. in air for two hours and thereafter the samples were loaded in a quartz-spring McBain-Bakr apparatus to determine (a) their oxygen adsorption capacity at 100 torr oxygen pressure and −183° C. and (b) their water vapor adsorption capacity at 4.6 torr water vapor pressure and ambient room temperature. The results are set forth in Table V below:

TABLE V

| | | Treatment Conditions | | | | Adsorption, wt-%* | |
|---|---|---|---|---|---|---|---|
| Sample | Zeolite | % F$_2$ | % O$_2$ | Contact Time Min. | Temp., °C. | O$_2$ | H$_2$O |
| A | Type Y | 0 | 0 | 0 | — | 24.6 | 23.2 |
| B | " | 2 | 0 | 5 | 60 | 20.2 | 8.4 |
| C | H$^+$Mordenite | 0 | 0 | 0 | — | 20.2 | 16.0 |
| D | " | 5 | 5 | 5 | 60 | 18.2 | 3.5 |
| E | ZSM-5-Type | 0 | 0 | 0 | — | 13.7 | 6.5 |
| F | " | 5 | 5 | 10 | 65 | 10.7 | 1.4 |
| G | Erionite | 0 | 0 | 0 | — | 21.0 | 14.8 |
| H | " | 5 | 5 | 5 | 60 | 17.3 | 7.2 |

*Samples activated at 350° C. for 16 hours under vacuum (10$^{-3}$ torr) The very low water loading of the fluorinated samples when compared to their untreated precursors having comparable crystallinity (as indicated by the O$_2$-adsorption capacity) is a clear indication of the degree of hydrophobicity attained.

EXAMPLE 6

To illustrate the effect of fluorination on the catalytic propertis of zeolites, samples of both fluorinated and non-fluorinated zeolites as described hereinbefore in Examples 2–5 were tested for the catalytic cracking of n-butane at 500° C. In each case the sodium content of the zeolite was below 0.1 wt-%. The activities of the zeolites were determined in the condition in which they existed immediately after fluorination with a fluorine-oxygen-nitrogen mixture, and after post-fluorination calcination at 600° C. for 2 hours in air and after post-fluorination washing with water. The results are set forth in Table VI below

TABLE VI

| Sample | Zeolite | Treatment Conditions | | | | n-butane cracking at 500° C. First order rate constant (cc/sec.g.) | | |
|---|---|---|---|---|---|---|---|---|
| | | % F$_2$ | % O$_2$ | Time, Min. | Temp., °C. | As treated | Calcined | Washed |
| A | Type-Y | 0 | 0 | 0 | — | — | 23.0 | — |
| B | " | 2 | 5 | 5 | 64 | 28.0 | 15.3 | 17.1 |
| C | " | 5 | 0 | 15 | 57 | 2.0 | 0.8 | 11.9 |
| D | " | 2 | 0 | 15 | Ambient | — | 45.3 | — |
| E | H-Mordenite | 0 | 0 | 0 | — | — | 68.5 | — |
| F | " | 5 | 5 | 5 | 60 | 50.8 | 1.7 | 72.3 |
| G | " | 5 | 0 | 10 | Ambient | — | 172 | 159 |
| H | " | 5 | 0 | 30 | Ambient | — | 231 | 238 |
| I | H-ZSM-5 | 0 | 0 | 0 | — | — | 27.1 | — |
| J | " | 5 | 5 | 10 | 65 | 22.0 | 0.9 | 76.1 |
| K | NH$_4^+$-Ω[1] | 0 | 0 | 0 | — | — | 156 | — |
| L | " | 5 | 5 | 5 | 65 | 232 | — | 191 |

[1]Prepared by NH$_4^+$-exchanged zeolite omega as synthesized. Product had a SiO$_2$/Al$_2$O$_3$ molar ratio of 7 and a Na$_2$O/Al$_2$O$_3$ molar ratio of 0.004.

As is readily apparent from the foregoing data, the n-butane cracking ability, and thus the acidity, of a zeolite can be altered by the fluorine treatment process of the present invention.

What is claimed is:

1. Process for enhancing the hydrophobicity of crystalline zeolites which comprises;
    (a) providing an activated crystalline zeolitic aluminosilicate having a SiO$_2$/Al$_2$O$_3$ molar ratio of at least 2, and having at least 60 percent, of the framework aluminum atoms not associated with metal cations;
    (b) contacting said activated aluminosilicate with a gas mixture comprising
        (i) from 0.1 to 20 volume percent fluorine
        (ii) from zero to 21 volume percent oxygen
        (iii) and as the remainder, one or a mixture of two or more inert gases,
    said contact being at a temperature of from about 50° F. to 400° F. for a period of at least 1 minute.
2. Process according to claim 1 wherein the starting activated crystalline aluminosilicate has a SiO$_2$/Al$_2$O$_3$ molar ratio of from 4 to 190.
3. Process according to claim 2 wherein at least about 90 percent of the framework aluminum atoms of the starting zeolite are not associated with metal cations.
4. Process according to claim 3 wherein the crystalline zeolitic aluminosilicate has the zeolite Y crystal structure.
5. Process according to claim 3 wherein the crystalline zeolitic aluminosilicate has the mordenite crystal structure.
6. Process according to claim 3 wherein the crystalline zeolitic aluminosilicate has the zeolite ZSM-5 crystal structure.
7. Process according to claim 3 wherein the crystalline zeolitic aluminosilicate has the zeolite omega crystal structure.
8. Process according to claim 1 which includes the further step of calcining the fluorine-treated zeolite at a temperature of from 500° C. up to the crystal destruction temperature of the zeolite.
9. Process according to claim 8 which includes the further step of rehydrating the fluorine-treated and calcined zeolite.
10. Process according to claim 1 which includes the further step of rehydrating the fluorine-treated zeolite.

* * * * *